United States Patent [19]

Cheresnowsky

[11] Patent Number: 5,271,911
[45] Date of Patent: Dec. 21, 1993

[54] METHOD FOR REMOVING POTASSIUM FROM MOLYBDENUM TRIOXIDE

[75] Inventor: Michael J. Cheresnowsky, Towanda, Pa.

[73] Assignee: GTE Products Corporation, Danvers, Mass.

[21] Appl. No.: 968,902

[22] Filed: Oct. 30, 1992

[51] Int. Cl.$^5$ .............................................. C01G 39/00
[52] U.S. Cl. ........................................ 423/53; 423/54; 423/202
[58] Field of Search ................. 423/53, 54, 55, 56, 423/58, 61, 593, 606, 202

[56] References Cited

U.S. PATENT DOCUMENTS

| | | | |
|---|---|---|---|
| 3,578,392 | 5/1971 | Ritsko | 423/54 |
| 3,694,147 | 9/1972 | Drobnick | 423/53 |
| 4,525,331 | 6/1985 | Cheresnowsky | 423/54 |
| 4,555,386 | 11/1985 | Cheresnowsky | 423/54 |
| 4,596,701 | 6/1986 | Cheresnowsky | 423/54 |
| 4,601,890 | 7/1986 | Cheresnowsky | 423/54 |
| 4,604,266 | 8/1986 | Cheresnowsky | 423/54 |
| 4,604,267 | 8/1986 | Cheresnowsky | 423/54 |
| 4,612,172 | 9/1986 | Brunelli et al. | 423/56 |
| 4,702,895 | 10/1987 | Cheresnowsky | 423/54 |
| 4,724,128 | 2/1988 | Cheresnowsky | 423/53 |
| 4,885,144 | 12/1989 | Cheresnowsky | 423/54 |
| 4,999,169 | 3/1991 | Cheresnowsky | 423/54 |
| 5,002,740 | 3/1991 | Cheresnowsky | 423/56 |

Primary Examiner—David Brunsman
Attorney, Agent, or Firm—Elizabeth A. Levy

[57] ABSTRACT

An improved method for substantially removing potassium from potassium-bearing molybdenum trioxide involves the use of a leach solution in a weight ratio of seven parts of the leach solution to one part molybdenum trioxide at a temperature of at least 90° C.

5 Claims, No Drawings

METHOD FOR REMOVING POTASSIUM FROM MOLYBDENUM TRIOXIDE

TECHNICAL FIELD

This invention relates to a process for removing potassium from potassium-bearing molybdenum trioxide through an acid leach treatment. More particularly, it relates to a method for removing substantial amounts of potassium from potassium-bearing molybdenum trioxide while restricting the molybdenum losses to less than 2%.

BACKGROUND ART

Processes for removing potassium from potassium-bearing molybdenum trioxide using an acid leach process are known. See, for example, U.S. Pat. No. 4,612,172 to Brunelli et al., which is assigned to the assignee of the instant invention.

Small amounts (as little as 100 parts per million) of potassium which remain in the molybdenum trioxide have a detrimental effect on the sintering of pure molybdenum powder. The presence of potassium in molybdenum powder which is to be sintered contributes to a lower sintered density in the final molybdenum part. Lower density of sintered molybdenum parts contributes to decreased strength and greater incidence of breakage.

Brunelli et al. report that excessive molybdenum losses will accompany the removal of potassium if the weight ratio of the acid leach solution to the molybdenum trioxide exceeds about 4.8 to 1.

It would be an advantage in the art to develop a process for removing even greater amounts of potassium from potassium-bearing molybdenum trioxide than is currently possible under the Brunelli et al. method while minimizing the loss of molybdenum.

SUMMARY OF THE INVENTION

It is an object of the invention to obviate the disadvantages of the prior art.

It is another object of the invention to provide a method for removing potassium from potassium-bearing molybdenum trioxide while restricting the loss of molybdenum.

These objects are accomplished, in one aspect of the invention, by an improvement to a method for removing potassium from potassium-bearing molybdenum trioxide using an acid leach process, the improvement comprising the use of a leach solution provided in a weight ratio of leach solution to molybdenum trioxide of 7:1. The leach solution consists essentially of a mineral acid, the ammonium salt of the mineral acid, and a spent molybdenum mother liquor. The leach solution is heated to at least 90° C.

Less than 2% of the molybdenum from the molybdenum trioxide is lost to the leach solution when the method of this invention is practiced. Furthermore, the potassium concentration remaining in the molybdenum trioxide is no greater than about 75 parts per million.

BEST MODE FOR CARRYING OUT THE INVENTION

We have determined that it is possible to remove a greater amount of the potassium which is present in the molybdenum trioxide than can be removed using prior art methods, if the acid leach solution is modified and the solution is provided in weight ratios that exceed 4.8 to 1. Specifically, a modified leach solution consisting essentially of a mineral acid, the ammonium salt of the mineral acid, and a spent molybdenum mother liquor, provided in a weight ratio of 7:1 and at a higher temperature, permits the removal of greater amounts of potassium while restricting the loss of molybdenum from the molybdenum trioxide to less than 2% by weight of the molybdenum trioxide. The resulting molybdenum compound contains less than about 75 weight parts per million of potassium.

The leach solution of the instant invention consists essentially of a mineral acid, the corresponding ammonium salt of the mineral acid, and a spent molybdenum mother liquor. For the purposes of this invention, the spent molybdenum mother liquor is an ammonium molybdate solution which may be obtained from a previous crystallization of ammonium dimolybdate in a process which is disclosed in U.S. Pat. No. 4,933,152, assigned to the assignee of the instant invention and hereby incorporated by reference. The preferred mineral acid is nitric acid and the preferred ammonium salt is ammonium nitrate. The ammonium salt is present in the leach solution as a result of a reaction between the nitric acid and the ammonium molybdate in the spent molybdenum mother liquor.

In the method of this invention, a technical grade molybdenum trioxide containing as much as 1000 weight parts per million potassium is contacted with a leach solution which has been heated to at least 75° C. and preferably at least 90° C.

The leach solution is provided in a weight ratio of at least 3 parts of the leach solution to one part of the molybdenum trioxide. It is preferred to use a weight ratio of 7 parts leach solution to one part molybdenum trioxide.

The leach solution which contains the molybdenum trioxide is maintained at a temperature of at least 75° C. and preferably at least 90° C. for at least one hour and preferably for three hours. The solution is preferably stirred constantly throughout this period. It is during this heating and stirring period that the potassium is leached out of the molybdenum trioxide into the leach solution.

At the end of the period the stirring is stopped and the leach solution containing the leached potassium is allowed to cool. The molybdenum trioxide solids are filtered from the leach solution containing potassium. The molybdenum trioxide solids are then washed in a deionized water bath, filtered, and then contacted with ammonium hydroxide to form an ammonium molybdate solution as disclosed in U.S. Pat. No. 4,933,152.

The following non-limiting examples are presented.

EXAMPLE 1

3:1 Weight Ratio, 60° C.

| | |
|---|---|
| MoO$_3$ | 120 grams |
| leach solution | 360 g |
| temperature | 60° C. |
| time | 1 hour |

One hundred-twenty grams (120 g) of technical grade molybdenum trioxide, MoO$_3$, was added to three hundred sixty grams (360 g) of a leach solution consisting of 140 milliliters of a spent molybdenum mother liquor (obtained from the process disclosed in U.S. Pat. No. 4,933,152), 230 milliliters of deionized water, and 132 milliliters of concentrated (15.9 Molar) nitric acid, HNO₃. The resulting solution was stirred during the addition of the molybdenum trioxide and heated to a temperature of 60° C. The solution was stirred and maintained at that temperature for 1 hour. It was then cooled to 35° C. and then filtered to separate the molybdenum trioxide from the leach solution. The molybdenum trioxide was then stirred into 420 milliliters of deionized water for 30 minutes and then filtered. The filtrates from the leach solution and this water wash were analyzed for molybdenum loss by atomic absorption techniques. The molybdenum trioxide solids were dried and then dissolved in at least two times the stoichiometric amount of ammonium hydroxide to form an ammonium molybdate solution. The ammonium molybdate solution was analyzed for potassium concentration using atomic absorption techniques. The results are shown in Table I.

EXAMPLE 2

3:1 Weight Ratio, 60° C.

| | |
|---|---|
| MoO₃ | 120 grams |
| leach solution | 360 g |
| temperature | 60° C. |
| time | 3 hours |

The procedure of Example 1 was followed with the following change: the leach solution containing molybdenum trioxide was maintained at 60° C. for 3 hours instead of 1 hour.

EXAMPLE 3

3:1 Weight Ratio, 90° C.

| | |
|---|---|
| MoO₃ | 120 grams |
| leach solution | 360 g |
| temperature | 90° C. |
| time | 1 hour |

The procedure of Example 1 was followed with the following change: the leach solution containing molybdenum trioxide was maintained at 90° C. instead of 60° C.

EXAMPLE 4

3:1 Weight Ratio, 90° C.

| | |
|---|---|
| MoO₃ | 120 grams |
| leach solution | 360 g |
| temperature | 90° C. |
| time | 3 hours |

The procedure of Example 1 was followed with the following change: the leach solution containing molybdenum trioxide was maintained at 90° C. instead of 60° C. for 3 hours instead of 1 hour.

EXAMPLE 5

7:1 Weight Ratio, 60° C.

| | |
|---|---|
| MoO₃ | 120 grams |
| leach solution | 840 g |
| temperature | 60° C. |
| time | 1 hour |

The procedure of Example 1 was followed with the following change: the weight ratio of leach solution to molybdenum trioxide was increased from 3:1 to 7:1.

EXAMPLE 6

7:1 Weight Ratio, 60° C.

| | |
|---|---|
| MoO₃ | 120 grams |
| leach solution | 840 g |
| temperature | 60° C. |
| time | 3 hours |

The procedure of Example 1 was followed with the following changes: the weight ratio of leach solution to molybdenum trioxide was increased from 3:1 to 7:1, and the leach solution containing molybdenum trioxide was maintained at 60° C. for 3 hours instead of 1 hour.

EXAMPLE 7

7:1 Weight Ratio, 90° C.

| | |
|---|---|
| MoO₃ | 120 grams |
| leach solution | 840 g |
| temperature | 90° C. |
| time | 1 hour |

The procedure of Example 1 was followed with the following changes: the weight ratio of leach solution to molybdenum trioxide was increased from 3:1 to 7:1, and the leach solution containing molybdenum trioxide was maintained at 90° C. instead of 60° C.

EXAMPLE 8

7:1 Weight Ratio, 90° C.

| | |
|---|---|
| MoO₃ | 120 grams |
| leach solution | 840 g |
| temperature | 90° C. |
| time | 3 hours |

The procedure of Example 1 was followed with the following changes: the weight ratio of leach solution to molybdenum trioxide was increased from 3:1 to 7:1, and the leach solution containing molybdenum trioxide was maintained at 90° C. instead of 60° C. for 3 hours instead of 1 hour.

Table I indicates the molybdenum losses from, and potassium concentration remaining in, the molybdenum trioxide treated by the method of the invention.

TABLE I

EFFECT OF INCREASED TIME, TEMPERATURE, AND WEIGHT RATIO OF LEACH SOLUTION TO MOLYBDENUM TRIOXIDE ON POTASSIUM REMOVAL AND MOLYBDENUM LOSS FROM MOLYBDENUM TRIOXIDE

| EX. | TIME | TEMP | RATIO | K (ppm) | % Mo LOSS |
|---|---|---|---|---|---|
| 1 | 1 hr | 60° C. | 3:1 | 160 | 2.2 |
| 2 | 3 hr | 60° C. | 3:1 | 150 | 3.3 |
| 3 | 1 hr | 90° C. | 3:1 | 100 | 2.8 |
| 4 | 3 hr | 90° C. | 3:1 | 100 | 12.1 |
| 5 | 1 hr | 60° C. | 7:1 | 73 | 5.6 |
| 6 | 3 hr | 60° C. | 7:1 | 120 | 4.1 |
| 7 | 1 hr | 90° C. | 7:1 | 69 | 1.8 |
| 8 | 3 hr | 90° C. | 7:1 | 84 | 1.9 |

Table I indicates that Examples 1–4, using a weight ratio of leach solution to molybdenum trioxide of 3:1 at temperatures of either 60° C. or 90° C., resulted in molybdenum losses to the leach solution of approximately 2 to 3%. Example 4 indicates an abnormally high percentage of lost molybdenum which resulted from a boilover during the experiment which caused excessive losses of leach solution and molybdenum trioxide. It is believed that Examples 1-3 are representative of the actual molybdenum losses under these conditions. Potassium concentrations remaining in the molybdenum trioxide in Examples 1-2 (weight ratio of 3:1, temperature of 60° C.) were substantially greater than 100 weight parts per million. Note, however, that potassium concentrations remaining in the molybdenum trioxide in Examples 3-4 (weight ratio of 3:1, temperature of 90° C.) decreased to 100 weight parts per million, because of higher leach solution temperatures.

Examples 5-6 (weight ratio of 7:1, temperature of 60° C.) resulted in predictably higher molybdenum losses and reduced potassium concentrations when compared to those of Examples 1-2, because of increased weight ratios of leach solution to molybdenum trioxide. However, Examples 7-8 (weight ratio of 7:1, temperature of 90° C.) resulted in unexpectedly lower molybdenum losses, as well as lower potassium concentrations (less than 100 parts per million). This unexpected reduction in molybdenum losses coupled with reduced potassium concentrations resulted from the combination of higher leach solution temperatures and the increased (7:1) weight ratio of leach solution to molybdenum trioxide.

While there have been shown what are at present considered to be the preferred embodiments of the invention, it will be apparent to those skilled in the art that various changes and modifications can be made herein without departing from the scope of the invention as defined by the appended claims.

I claim:

1. In a method for removing potassium from potassium-bearing molybdenum trioxide using an acid leach process, the improvement comprising the use of a leach solution provided in a weight ratio of leach solution to molybdenum trioxide of 7:1, wherein said leach solution consists essentially of a mineral acid, the ammonium salt of said mineral acid, and a spent molybdenum mother liquor, and wherein said leach solution is heated to at least 90° C.

2. A method according to claim 1 wherein said spent molybdenum mother liquor is an ammonium molybdate solution.

3. A method according to claim 1 wherein said mineral acid is nitric acid and said ammonium salt is ammonium nitrate.

4. A method according to claim 1 wherein less than 2 percent molybdenum by weight of said molybdenum trioxide is lost to said leach solution.

5. A method according to claim 1 wherein the concentration of potassium remaining in said potassium-bearing molybdenum trioxide after treatment in said leach solution is no greater than about 75 weight parts per million.

* * * * *